Oct. 1, 1957 L. A. MEACHAM 2,808,462
SUBSCRIBER TELEPHONE SET
Filed Oct. 8, 1954
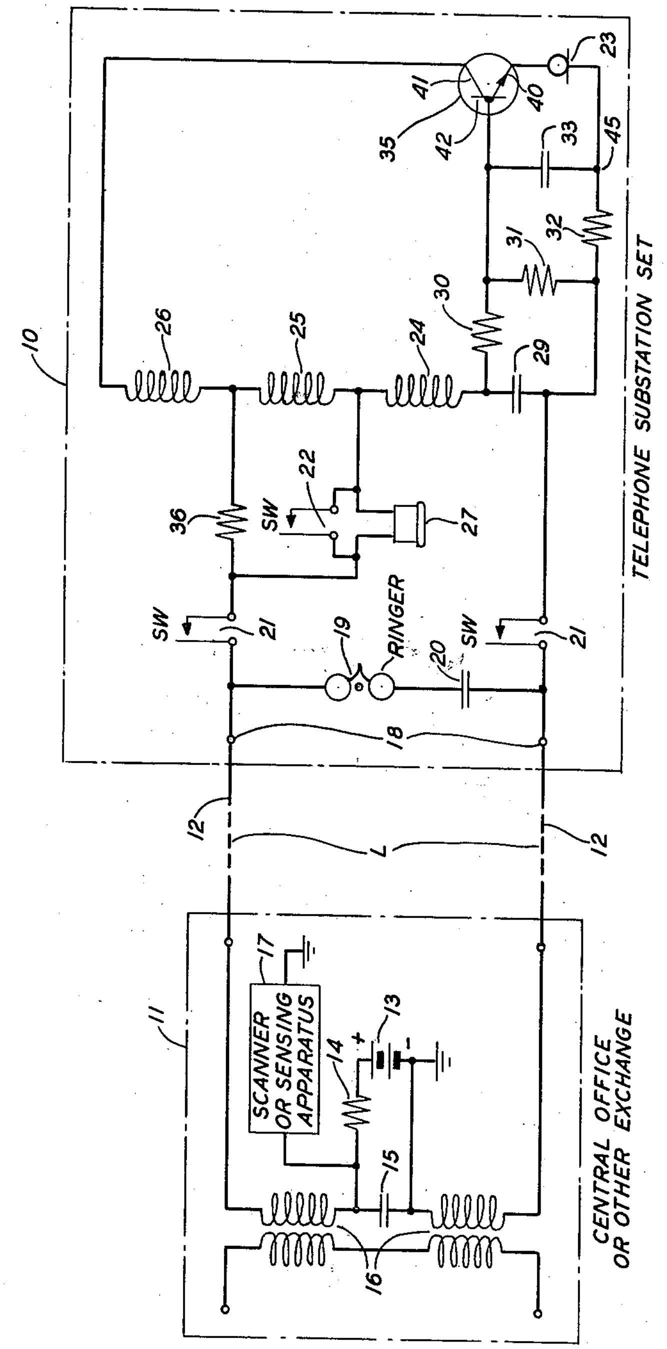
INVENTOR
L. A. MEACHAM
BY John C. Morris
ATTORNEY United States Patent Office 2,808,462

Patented Oct. 1, 1957

2,808,462

SUBSCRIBER TELEPHONE SET

Larned A. Meacham, New Providence, N. J., assignor to Bell Telephone Laboratories, Incorporated, New York, N. Y., a corporation of New York Application October 8, 1954, Serial No. 461,145

12 Claims. (Cl. 179—81)

This invention relates to telephone substation sets and more particularly to so arranging and proportioning the elements of a telephone substation set including a transistor that the set will approach maximum theoretical over-all efficiency for transmitting. This efficiency is ideally realized when, for a full-load acoustic signal, fifty percent of the total energy drawn from the battery or other direct-current power source is delivered to the line as a useful voice-frequency signal.

A principal object of this invention is to greatly increase the transmitting efficiency and to reduce the current drain of a telephone substation.

An ancillary object is to enable the use of smaller wire sizes for telephone loops and the use of longer loops with standard wire sizes.

The majority of subscriber telephone systems in present use are of the common battery type in which direct-current power is supplied for signaling and talking purposes from a voltage source at a central office or exchange. This direct-current power enables a telephone transmitter of the variable resistance carbon type to amplify, that is, to cause the voice-frequency electrical output power to exceed the corresponding acoustical input power. It can be shown that a carbon transmitter having a constant modulation efficiency produces an amount of signal power proportional to the direct-current power actually supplied to the modulator.

In present telephone practice, signaling requirements prescribe relatively high currents. As a consequence, telephone transmitters have a resistance considerably lower than that of the transmission wire loop over which they are supplied. Such transmitters are, therefore, unable to absorb as large a fraction of the direct-current power drawn from the battery as they would if they were of appreciably higher resistance, particularly as compared to the resistance of the subscriber's loop. With the advent of electronic switching systems, however, such as are disclosed, for example, in Patent No. 2,655,559, W. A. Malthaner et al., granted October 13, 1953, signaling arrangements are possible which do not necessitate the high loop currents as hereinbefore described. It has thus become practicable to raise the resistance of the telephone transmitter in order to achieve improved over-all efficiency. There are, however, practical limitations to increasing the resistance of the carbon type of transmitter to the extent needed to achieve a significant improvement in efficiency.

In accordance with this invention a transistor in the substation set circuit effectively translates the resistance level of the transmitter in regard to direct as well as alternating current up to a value enabling an over-all transmitting efficiency more closely approaching the theoretical maximum.

In one specific embodiment, a carbon transmitter is connected in series with the emitter electrode of an npn transistor operating in the grounded base mode. That is, a transistor having the base electrode common to both the input, or emitter electrode, and output, or collector electrode, circuits. A consideration of the several operating modes of the transistor may be found in the article entitled "Some circuit aspects of the transistor," by R. M. Ryder and R. J. Kircher, Bell System Technical Journal, volume 28, July 1949, page 373, which is cited in the hereinafter referred to paper by Wallace and Pietenpol. An auto-transformer effectively steps up the alternating-current impedance of the subscriber's loop to a value so related to the high transmitter resistance effectively presented by the collector-to-emitter path of the transistor that optimum modulation efficiency is realized. Thus, the increased value of resistance enables an increase in the over-all transmitting efficiency approaching the theoretical maximum.

Thus, in one general aspect, a feature of applicant's invention resides in the inclusion of a transistor in the modulating means of a telephone substation set.

A further feature is found in the arrangement and proportioning of other circuit elements of the subset.

Other objects and features of this invention will be apparent from the following detailed description taken in conjunction with the drawing in which the single figure is a simplified schematic drawing of a telephone substation set embodying the principles of this invention.

Referring now to the drawing, a substation circuit 10 of the common battery anti-sidetone type is connected to a central office or other exchange 11 by a telephone line 12. For illustrative purposes there is shown at the central office or exchange only the common direct-current supply and supervisory signaling elements in schematic form. The direct-current supply comprises the battery 13 with supply coils 16 and blocking condenser 15. Supervision of the subscriber's loop may be advantageously achieved in the low current circuit of this invention by detecting small changes in direct-current voltage drop across a series resistor 14. For this purpose scanning or sensing arrangements such as are disclosed in the application of F. T. Andrews, Jr., Serial No. 302,445, filed August 2, 1952, now Patent No. 2,715,656, issued August 16, 1955, are suitable. For purposes of simplification, such equipment is represented by the box outline 17.

Turning now to the telephone substation set 10 there is connected across the line near the input terminals 18 a ringer 19 in series with a condenser 20. Switchhook contacts 21 are provided in both conductors of the line and a switchhook contact 22 is provided across the receiver 27. In a well known manner, switchhook contacts 21 are normally open while contact 22 is normally closed, short-circuiting the receiver.

The subset circuit includes the receiver 27 and transmitter 23 of the carbon button type. The multiple winding induction coil composed of the three windings 24, 25, and 26 connects the receiver 27 and transmitter 23 in an anti-sidetone circuit. A transistor 35, which may be of npn configuration, is connected with the collector electrode in series with coil 26 of the multiple winding induction coil, and with the emitter electrode in series with the transmitter 23 and the resistor 32. Bias potential is applied to the base electrode of the transistor via a voltage divider comprising the resistors 30 and 31 while the bypass condenser 33, in effect, causes the transistor to operate in the grounded-base mode. That is, the base electrode is connected in common to the input circuit of the emitter electrode 40 which includes the transmitter 23, and to the output circuit of the collector electrode 41 which includes the multiple windings 24, 25, and 26. A more detailed consideration of the specific operating characteristics of transistors suitable for the practice of this invention is found in the article "Some circuit properties and applications of NPN transistors," by R. L. Wallace and W. J. Pietenpol, Bell System Technical Journal, volume 30, July 1951, page 530.

Resistor 32 has a function analogous to that of the selfbiasing cathode resistor in vacuum tube practice; serving to stabilize the direct-current emitter current by negative feedback. With respect to the alternating-current audio-frequency load circuit, resistor 32, having low resistance, absorbs only a small fraction of the transistor output, being connected in series with the high impedance transformer primary represented by windings 24, 25, and 26 in the path between collector electrode 41 and effective "ground," which may be taken as the point 45. Condenser 29 provides a purely alternating-current path through that portion of the loop. The receiver circuit includes the coil 25 of the multiple winding induction coil and resistor 36 to provide sidetone balancing.

The advantageous operating characteristics of the circuit of this invention are discernible from a consideration of typical illustrative circuit values. Taking the maximum single frequency transmitter output to be 16 milliwatts at, typically, 90 percent modulation of current and voltage, respectively, the direct-current power required by the high resistance modulator consisting of the transistor and carbon transmitter is determinable from the relation $$P_{dc(mod.)}=\frac{2P_{ac}}{ab} \qquad (1)$$

to be about 40 milliwatts; where $P_{dc(mod.)}$ is the direct-current power supplied to the modulator; $P_{ac}$ is the alternating-current power supplied to the load represented by dissipative elements coupled to the collector circuit of the transistor; $a$ is the percentage modulation of the modulator bias current; and $b$ is the percentage modulation of the modulator bias voltage, both $a$ and $b$ being expressed as fractions.

Reference to the graph of Fig. 4 of the above-noted article by Wallace and Pietenpol indicates that a suitable operating point for a typical npn transistor is represented by a collector current of two milliamperes at a voltage drop of 20 volts. The corresponding power thus is: $P_{dc(mod.)}=(20\ (.002)=.04$ watt, or 40 milliwatts and the direct-current resistance is:

$$R_0=\frac{E}{I}=\frac{20}{.002}=10{,}000 \text{ ohms} \qquad (2)$$

This resistance value is comparable with a figure of about 60 ohms for conventional substation transmitters. In order to enable an approach to 100 percent modulation or a value of one, for both $a$ and $b$ in expression (1), this value of resistance must be made approximately equal to the alternating-current load impedance in the output circuit of the transistor. The impedance of the connecting loop L typically may be about 900 ohms. Hence, the multiple winding coil comprising the coils 24, 25, and 26 functions as an auto-transformer to, in effect, step-up the loop impedance to approximately the value (10,000 ohms) desired for the modulator load.

In this particular illustrative example of the invention condensers 29 and 33 may each have a capacitance of two microfarads, biasing resistors 30 and 31 may be 100,000 ohms and 13,000 ohms, respectively, and the stabilizing resistor 32 may be 500 ohms. The resistor 36 of the sidetone balancing network may have a resistance of 900 ohms. For the foregoing values of circuit elements and assuming coils 24 and 25 to have equal numbers of turns, that is $$N_{24}=N_{25} \qquad (3)$$

then for the desired impedance match to a 900 ohm loop, $$(N_{24}+N_{25})^2:(N_{24}+N_{25}+N_{26})^2=(900+900):10{,}000$$

and $$N_{24}:N_{25}:N_{26}=2.1:2.1:5.8 \qquad (4)$$

With these values, half of the power $P_{ac}$ is dissipated in the sidetone balancing network, and the remainder, or eight milliwatts for the single frequency, full load signal, is delivered to the line.

The carbon transmitter 23 may have a working resistance of the order of 50 ohms, preferably chosen to match the low impedance presented to it by the emitter circuit of the transistor. For a given acoustic signal, the transmitter then produces a certain percentage modulation of its bias current and a roughly equal percentage modulation of its bias voltage. Since, as shown by Wallace and Pietenpol, the collector current and emitter current of a typical npn transistor are approximately alike in magnitude, differing only by an amount represented by the relatively small base current, the resulting percentage modulation $a$ of the collector current is approximately the same as that of the emitter current. As has been shown, a proper choice of load impedance for the collector circuit results further in an equal value for the percentage modulation $b$ of the collector bias voltage. In other words, for the contemplated impedance relationships, the same percentages of modulation exist in the collector circuit of the transistor as those in the associated carbon transmitter. The carbon element here operates upon a small bias current at a low power level; the transistor effectively translates the modulating action to much higher levels of voltage at about the same current, and hence to higher levels of impedance and power.

Although the circuit depicted in the drawing utilizes an npn transistor it will be understood that a pnp may be substituted therefor, necessitating only a change in the polarity of the direct-current supply. Similarly, other circuit configurations well known in the telephone art may be employed to produce variants of the particular subset circuit herein disclosed.

From the foregoing brief analysis, it is apparent that the circuit of this invention, utilizing a transistor as a high resistance modulator, enables the same speech signal output for a loop current of two milliamperes as is now produced in conventional substation set circuits with a loop current of more than 25 milliamperes. Thus, it is possible to transmit over longer loops with present wires or, to enjoy marked savings by the use of smaller diameter wire on shorter loops.

Although specific embodiments of the invention have been shown and described it will be understood that they are but illustrative and that various modifications may be made therein without departing from the scope and spirit of the invention.

What is claimed is:

1. A telephone set circuit connected to a telephone loop, said circuit including a transistor and a multiple winding induction coil, a high resistance direct-current branch across said loop comprising one winding of said coil, the collector-emitter circuit of said transistor and a telephone transmitter in serial connection, said transistor having a common connected base electrode and means biasing said electrode, and an alternating-current branch across said loop including the other windings of said coil.

2. A telephone set circuit in accordance with claim 1 in which said telephone transmitter is of the variable-resistance carbon type.

3. A telephone set circuit in accordance with claim 1 in which said transistor is of the npn type.

4. A telephone set circuit in accordance with claim 1 in which said transistor is of the pnp type.

5. A telephone set circuit connected to a telephone loop, said circuit including a transistor, a multiple winding induction coil, and a telephone transmitter, a high resistance direct-current branch across said loop comprising one winding of said coil, the collector-emitter circuit of said transistor and said transmitter in serial connection, said transistor having a common connected base electrode and means biasing said electrode, an alternating-current branch across said loop including the other windings of said coil, and a resistance element common to both said branches.

6. A telephone set circuit in accordance with claim 5 in which said transmitter is of the variable resistance carbon type.

7. A telephone set circuit in accordance with claim 5 in which said transistor is of the npn type.

8. A telephone set circuit in accordance with claim 5 in which said transistor is of the pnp type.

9. A telephone set circuit connected to a telephone loop, said circuit including a transistor, a multiple-winding induction coil and a telephone transmitter, a high resistance direct-current branch across said loop comprising one winding of said coil, the collector-emitter circuit of said transistor and said transmitter in serial connection, said transistor having a common connected base electrode and means biasing said electrode, said means comprising a second direct-current branch connected in parallel relation with said first direct-current branch, and an alternating-current branch across said loop including the other windings of said coil.

10. A telephone set circuit in accordance with claim 9 in which said transmitter is of the variable resistance carbon type.

11. A telephone set circuit in accordance with claim 10 in which said transistor is of the npn type.

12. A telephone set circuit in accordance with claim 10 in which said transistor is of the pnp type.

No references cited.